Oct. 14, 1969        H. J. BARNETT        3,471,976
PROCESS FOR MAKING A MULTIFOCAL CONTACT LENS
Original Filed Jan. 27, 1964
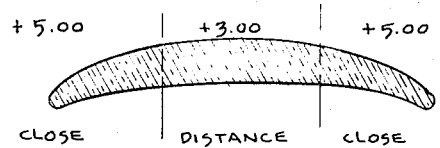
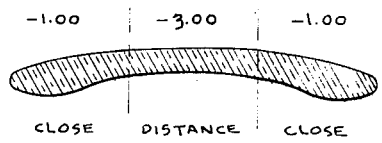
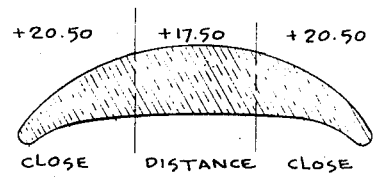
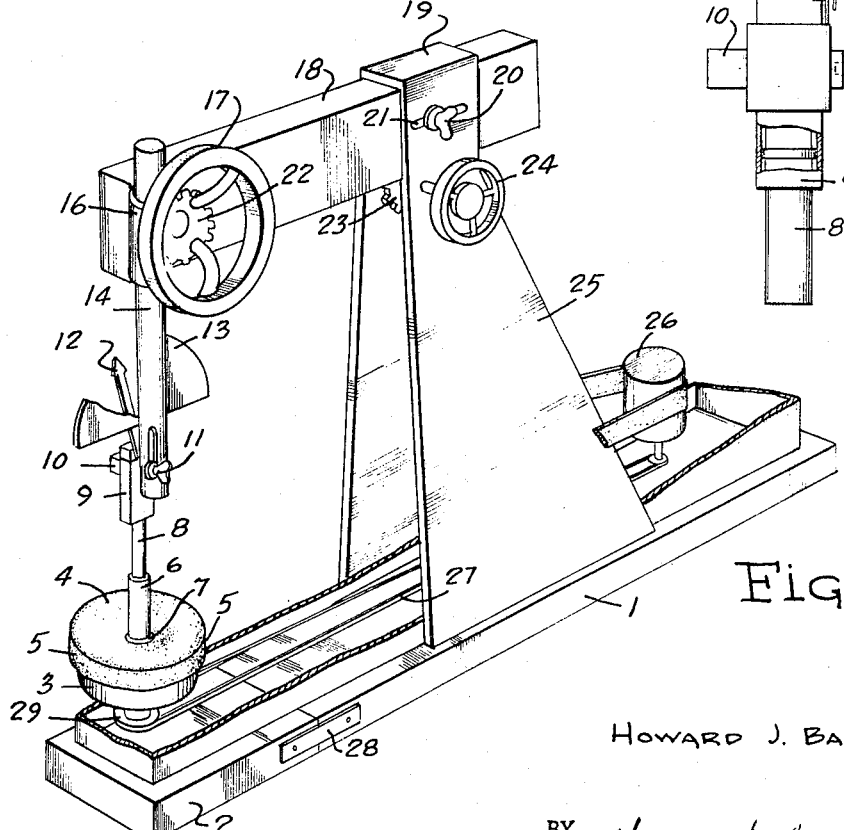
INVENTOR
HOWARD J. BARNETT
BY *Harvey J. Boyd*
ATTORNEY United States Patent Office 3,471,976
Patented Oct. 14, 1969

3,471,976
PROCESS FOR MAKING A MULTIFOCAL
CONTACT LENS
Howard J. Barnett, San Francisco, Calif.
(1802 Rupert St., McLean, Va. 22101)
Original application Jan. 27, 1964, Ser. No. 340,574, now Patent No. 3,420,006, dated Jan. 7, 1969. Divided and this application Feb. 19, 1968, Ser. No. 719,824.
Int. Cl. B24b 1/00
U.S. Cl. 51—284                    4 Claims

ABSTRACT OF THE DISCLOSURE

A process for making a multifocal contact lens having a central distance correction portion and a ring concentric thereto for near correction, the region between these two having a diopter which varies continuously and progressively so as to provide within the region an infinite number of zones having progressively different diopter values. The process includes the steps of supporting a stretched flexible member about the periphery thereof, coating the member with a grinding compound, and spinning the member while contacting the member with a contact lens blank mounted on a freely rotating assembly to thereby grind the blank to achieve a lens having an infinite number of zones with progressively different diopter values between the correction portions of the lens.

---

This is a divisional application of my co-pending patent application, Ser. No. 340,574, filed Jan. 27, 1964, now Patent No. 3,420,006, granted Jan. 7, 1969.

The invention described herein may be manufactured and used by or for the Government for governmental purposes without the payment to me of any royalty thereon.

Multifocal lenses find use in a variety of applications and the process herein described may be employed to produce multifocal lenses for many applications but the description will be directed primarily to multifocal contact lenses.

Previously, the bifocal or multifocal contact lenses have not been satisfactory because of the visible dividing line between the separate diopter areas caused by grinding these lenses on a lathe or formed lap. Even though these lenses were not satisfactory they were quite expensive to make because of the great amount of labor involved in accurately setting up a lathe to grind a particular lens. Other disadvantages of the lathe ground bifocal lenses are that patients complained of lenses not being comfortable, the lenses popped out, the patient's vision was not clear in that some objects looked curved, and that they felt insecure when walking.

Perhaps the cause of these disadvantages lies in the fact that there is a sharp boundary between the two different diopters in the lens. The boundary line is even more pronounced in contact lenses because these lenses are right next to the eye than in normal framed spectacles in which the bifocal line is spaced a distance from the eye. Persons who have been accustomed to wearing single vision contact lenses have been unable to adapt to the lathe ground or formed lap ground bifocal lenses. In single vision contact lenses there is only one diopter for both near and far vision and there is no boundary line across which the eye has to shift.

This invention seeks to correct the disadvantages previously caused by bifocal, trifocal, or multifocal lenses, particularly contact lenses. This is done by producing a lens that has no boundary line and has a gradual feathering contour from one diopter to another.

An object of this invention is to provide a process for producing multifocal contact lenses having no boundary lines between the near and far vision areas.

Another object of this invention is to provide a process for producing bifocal contact lenses from a single vision contact lens blank wherein there is no boundary line between the near and far vision areas.

FIG. 1 is a cross section of a multifocal lens showing an example of the positive diopters that can be incorporated in a lens;

FIG. 2 is a cross section of a multifocal lens showing an example of the negative diopters that can be incorporated in a lens;

FIG. 3 is a cross section view of a contact lens having a very large positive diopter in both the near and far vision areas;

FIG. 4 is a perspective view of the lens grinding apparatus; and

FIG. 5 is a side view of the hinge assembly on the lens grinding apparatus.

THE LENS

The term multifocal will be used throughout this specification to indicate that there is no sharp boundary between the separate diopter areas. In a sense the lenses shown in FIGS. 1, 2, and 3 are of the bifocal type, but this term is too limiting in that it implies that there are only two diopters throughout the entire contact lens. This is not true of the present invention because, in between the two main diopter areas there is a gradual taper from one diopter to the other. For instance, if the near correction is +5.00 diopters and the far correction is +3.00 diopters there would be an area of taper between the two. There might be one point between the near and far correction which had +3.50 diopters, another point with 4.00 diopters, and still another point with +4.50 diopters. Also, there would be a gradual taper between the above three mentioned diopters. For this reason, the lenses described in this application are more than mere bifocals having two areas of magnification of different power meeting in a distinct boundary line. The term multifocal has been chosen to more correctly describe the lenses and to include the tapering area between the two chosen diopters which in fact also has a diopter although this diopter is constantly changing as one progresses from one chosen diopter to the other.

FIG. 1 shows a typical contact lens, which is of the cornea size as are all the lenses illustrated. It is not meant to limit this invention only to the grinding and producing cornea lenses which cover only the cornea, but the same process could be used for the larger type contact lenses.

Cornea type contact lenses are easily adapted to bifocal or multifocal production because this type of lens slides up and down as the eye is moved. For instance, when the wearer is looking straight ahead which would be distance viewing, he is looking through the center portion of the contact lens. The center area of the lens is ground to the wearer's far correction diopter. As the wearer's eyes drop such as in reading, the cornea contact lens comes in communication with the lower eyelid and is held from continuing movement with the cornea. When this happens the cornea type lens slides up with the relation to the cornea itself thereby causing the axis of view to be through the lower portion of the contact lens. Similarly, when the wearer's eyes are raised to gaze at a distant object, the lens will slide down in relation to the cornea and the center of view will again be through the center area of the lens. The cornea type contact lenses do not fit under the eyelid but instead cover only the cornea and are held on by surface tension of the tear covering of the eye. As the eye is moved up and down, the cornea lens will ride on this tear layer between the limits of the upper and lower eyelid. Closing of the eye or blinking is not affected by the cornea contact lens. Upon closing, the upper eyelid easily slides over the cornea lens.

FIG. 1 shows a typical cornea contact lens prescribed for a person needing bifocal lenses. As can be seen from the drawing the near correction is +5.00 diopters and the far correction is +3.00 diopters indicating that the patient sees better at a distance but not so well at near work such as reading. As was pointed out in the preceding paragraph, the cornea type contact lens works as follows. The wearer when gazing at distance such as when in driving an automobile has his axis of vision directed through the center of the lens and has a +3.00 diopter correction. Because of the outward bulge of the cornea area of the eye the lens is centered over this portion of the eye in distance viewing. When the wearer lowers his eyes such as to read a book, the lower edge of the lens is held in nearly the same position it was in for distant viewing but the eye itself is rotated downwardly. The eyes as they are looking down at the book are actually viewing through the lower portion of the lens or as in the example, the +5.00 diopter correction.

Many things contribute to the magnification power of a particular lens, perhaps the most important being the index of refraction of the material, such as a clear plastic composition or glass, and the relationship of the two curved surfaces of the lenses. In general in a positive diopter lens such as in FIG. 1, the more curved the outer surface is the larger diopter the lens will have and hence the more positive magnification power. The +3.00 diopter area in the center of the lens has a much flatter curve than does the +5.00 diopter area. As was pointed out in the beginning of this specification, the problem up to now has been the junction line formed when the two separate diopter areas meet. In making the lens by the old lathe or formed lap method it is very difficult to eliminate the junction line which causes blurred vision and distortion.

The two vertical lines in the cross sectional view of the lens in FIG. 1 represent the mean position of where one diopter fades into another. There is really no distinct mark to correspond to these lines or any boundary line and in the present invention there is no way of knowing exactly where the boundary is. It is in the vicinity of the vertical line but because of the overall gentle curve of the surface of the lens from the edge to the center a specific boundary line cannot be identified. The process and apparatus for producing this no boundary bifocal lens will be described in subsequent paragraphs.

FIG. 2 shows a no boundary bifocal lens or more correctly a multifocal lens wherein the two areas have negative diopters. This type of lens is used on patients where the eye causes overmagnification and the correction for both near and far vision are negative diopters. It will be noted that this lens is thicker at the edges than in the center. A typical prescription has been chosen to illustrate this type of lens. Here, the distance correction is −3.00 diopters and the near correction is −1.00 diopters. The grinding process on the outside of this lens is the same as applied to the lens in FIG. 1 and it also leaves a gradual taper from the near to distance correction even though both are of negative diopters.

FIG. 3 shows a multifocal lens in which the near and distance corrections are both high positive diopters. This illustrates the great diopter range that can be produced by the process and apparatus of the invention. In this figure a lens has been prescribed with an extremely large positive diopter correction both in the near and far vision areas. The distance correction is +17.50 and the near correction is +20.50 diopters. This example is not merely picked at random but has actually been made on the apparatus to be described in this application and is being worn by a patient with very satisfactory results. It should be noted that the process and apparatus of the invention can produce lenses having higher diopters than shown in FIG. 3, if desired. Conditions that make such large positive corrective diopters necessary include unilateral and bilateral aphakia which involve the removal of the crystalline lenses from one or both eyes, respectively. In some cases the eye lens develops certain crystalline grains or particles in the lens itself and as this continues the lens becomes very cloudy and the patient cannot see. The treatment usually prescribed for this condition is surgical removal of one or both lenses. When this is done contact lenses or framed glasses are necessary to compensate for the removed lenses. Within the eye itself the normal lens has a very high diopter. When one considers that the lens in the human eye lies only about 1 inch in front of the retina and is capable of focusing the image entering the eye from the nearest object out to infinity on the retina, it is not hard to see why a lens in the human eye can run over 20 positive diopters. To correct the vision of a person who has had unilateral or bilateral aphakia a large positive diopter multifocal contact lens such as in FIG. 3 is prescribed. FIGS. 1, 2, and 3 give illustrations of lenses of positive and negative diopter corrections, and also a lens suitable for correcting unilateral or bilateral aphakia. All of these lenses can be produced on the apparatus of this invention using the disclosed process of this invention.

THE PROCESS

The lenses and their characteristics have been described above. The process for making these lenses is quite simple. In fact the simplicity of the process is one of the main advantages of this process over the previous processes for making bifocal lenses. The present process begins with a single vision lens blank which can be purchased from any optical house and which is inexpensive. All that is needed to convert this single vision lens into an accurate multifocal contact lens is merely 5 to 10 minutes work by the operator of the machine to be described. Before, several hours were required to set up lathes and formed laps at the precise angle in order to prepare one bifocal contact lens, and then it had a boundary line. The present process includes taking a single vision contact lens blank of the diopter correction for the near correction, mounting it on a free turning spinner, causing the lens blank to rotate against a polish impregnated material stretched across a spinning shell or bowl. The spinning bowl and polish impregnated material grinds and polishes the center of the lens to conform to the distance correction diopter. In order to grind the proper corrective diopter in the center or distance correction of the lens, the lens is held at an angle to the vertical and at a distance from the center of the spinning dish. The larger the area of the distance correction portion of the lens to be ground the greater the angle from vertical the lens is held. To illustrate the process a typical lens prescription will be taken from beginning to end.

(A) A lens is prescribed having a near correction of +5.00 diopters and a distance correction of +3.00 diopters. The lens is to be of the cornea type, and is of standard size. However in the case of abnormal pupil size and palpebral fissure it may be necessary to fit slightly larger in these cases.

(B) The concave side of a lens blank of the single vision cornea lens having a diopter of the near correction is mounted on the spinner tool by means of a piece of double sided tape. The diopter of the single vision lens blank in this case is +5.00 diopters.

(C) Polishing compound is spread evenly over the fabric or chamois skin stretched over a powered spinning bowl.

(D) The lens on the free spinning spinner is spun lightly (convex side on the chamois skin) approximately 4–5 millimeters from the center of the spinning bowl. The spinner is held at an angle of approximately 4–15 degrees from the vertical. For a larger portion of distance correction area greater angle and more pressure is used on the lens.

(E) In this manner the power of the center portion of the lens is reduced. Because the flexible member, e.g., cloth or chamois comprising the grinding surface is stretched more toward the middle than toward the edge, and because the grinding speed is less toward the center of the rotating bowl than toward the edge, the radius of curvature formed by the grinding continuously decreases progressing from the centermost portion that is ground to the edge portion that is ground, thus producing the annular region having continuously and progressively varying diopters within it. There is always a finite region in the center which has a uniform diopter, and this is the distance correction region. The grinding is continued until the edgemost portion of the lens being ground or reduced is within .25 diopter of the near correction diopter. At this point the lens is spun in the center of the spinning bowl in a vertical position to clean up the optics (i.e. remove any cylinder if present and remove any distortion if present). This last step will remove the final .25 diopter.

(F) The center portion of the lens now has the power of the patient's distance prescription while the periphery retains the power of the near correction. The completed lens is as follows:

(1) Distance $Rx = +3.00$ diopters.
(2) Near Add (the difference between the near and distance corrections in positive diopters) $= +2.00$ diopters.
(3) Initial lens blank power $= +5.00$ diopters.
(4) Center power reduced by 2.00 diopters leaving a power of $+3.00$ diopters at the center.
(5) The periphery still retains the $+5.00$ diopters for the near correction.

(G) By using this process there is no definite division line between the distance and near powers, one blends into the other thus achieving a multifocal effect.

(H) Distance objects are viewed through the center or distant portion of the lens.

(I) When the eyes are lowered from the primary position the lens is displaced superiorly so that near objects are seen through the peripheral or near portion.

The example taken through the process above was the identical lens shown in FIG. 1. The same process would also be applicable to the lens in FIG. 3. Here the lens blank ordered is one of $+20.50$ diopters and the center portion reduced by 3.00 diopters to $+17.50$ diopters.

The same process is used to produce the negative diopter lens of FIG. 2. It is noted that in both FIG. 1 and FIG. 3 the process involves subtracting positive diopters from the center portion of the lens through the unique grinding process of this invention. In this FIG. 2 instead of subtracting positive diopters, negative diopters are added. Algebraically and mechanically this amounts to the same thing. The lens blank ordered for FIG. 3 is a single vision $-1.00$ diopter lens blank. This lens blank is mounted on the spinner and rotated in the same manner as was the lens blank in FIGS. 1 and 3. Since the inside surface of the lens in FIG. 2 is more curved than the outside surface, a flattening out of the outside surface will cause the diopter correction to increase negatively. When this center portion is ground down to about $-2.75$ diopters the spinner is positioned vertically with respect to the spinning bowl and held in its center to clear up the optics and take off the remaining $-.25$ diopter giving a finished lens having a distance correction at its center of $-3.00$ diopters and a near correction of $-1.00$ diopter at the edges.

In the preceding examples of the process described only three prescriptions were taken. It is not meant to limit the process to only these three but any prescription whether of positive or negative diopter correction can be made by this process.

THE APPARATUS

Now that the type of lens to be made and the process for making it has been described, the apparatus for accomplishing this result will be explained. In the perspective view of the apparatus in FIG. 4 is shown the multifocal contact lens 7 and the structure for producing it. In general the apparatus resembles a drill press having a great many degrees of movement and a spinning bowl instead of a table. The whole grinding apparatus is built upon a base 1 which is provided with holes for anchoring the device onto a bench or table. To the front of base 1 is a spinning bowl support 2 fastened with strap 28. Internal of this spinning bowl support 2 is a bearing means providing a support to both the end and side thrust of the spinning bowl mounted on a cylindrical member 29. External of the spinning bowl support is a pulley mounted on cylindrical member 29 and this pulley is powered by V-belt 27 which connects the pulley to motor means 26. Cylindrical member 29 supports a spinning bowl 3 which has stretched across it a flexible fabric or hide, such as a chamois skin 4. This chamois skin is held in its stretched condition across the mouth at the top of bowl 3 by a rubber band 5. When the chamois skin becomes worn it can easily be replaced by merely removing the rubber band and applying a new chamois skin. As motor 26 spins the bowl 3 through the connecting V-belt 27 the stretched chamois skin spins around and when smeared with a grinding compound such as Silvo silver polish forms a spining abrasive surface. The stretched chamois skin 3 is flexible enough so that the abrasive surface is curved when a contact lens is pressed against it. A small depression is made by the contact lens causing the chamois skin to grind away a curved portion of the contact lens. As can be seen the stretched chamois skin is completely different from any type of rigid formed lap or a rigid lathe. It is flexible and as such can grind out the center portion of a contact lens without the need to set any rigid cutting tool.

The structure above the base 1 and spinning bowl 3 is used for the purpose of positioning the spinning contact lens with relation to the spinning bowl and chamois skin. Fastened to base 1 is vertical support member 25 which carries a horizontal rectangular sleeve 19 to receive horizontal traversing member 18. Traversing member 18 has a rack (not shown) connected to the bottom side of it which engages with sprocket 23. This sprocket 23 which is connected to hand wheel 24 for moving the traversing member 18 is supported within vertical support 25. A slot 21 is provided in rectangular sleeve 19 and a bolt with wing nut 20 locks the traversing member 18 at a fixed position within the sleeve 19.

At one end of traversing member 18 is a vertical cylindrical sleeve 16 which serves as a guide for vertical shaft 14. Shaft 14 is moved up and down within vertical sleeve 16 by means of a sprocket 22 which engages a rack fastened to said vertical shaft. By turning wheel 17 which is connected to the sprocket 22 the whole shaft 14 and its appendages can be raised and lowered. Sprocket 22 is mounted to horizontal traversing member 18 in a manner allowing rotation of this sprocket.

The lower end of shaft 14 is connected to a hinge assembly which will permit the spinner 6 to be positioned in angular relationship to the vertical shaft 14. This hinge assembly, shown in FIG. 5, is comprised of pivot pin 11, which is rigidly attached to rotatable clamping member 10, and a clamped member 9 which can move freely in a vertical plane when clamping member 10 is released. Through the lower end of shaft 14 is a bore 15 through which pivot pin 11 extends to clamping member 10. When the exact angular position of clamping member 10 and clamped member 9 is determined, this position can be locked with a locking nut or wing nut 30 on the threaded end of pivot pin 11. On the far side of vertical shaft 14 is secured a semi-circular dial 13 which can be calibrated in degrees from the vertical or in millimeters with the largest diopter reading being the edges of the dial. Affixed to the clamping member 10 of the hinge assembly is a pointer 12 which extends up over the face of the dial 13. By grinding a series of lenses at different settings of the angular hinge assembly the dial can be calibrated. For instance a setting of 8° from vertical might correspond to 3 millimeters and a setting of 12° might correspond to 5 millimeters and so on.

Clamped member 9 is provided with a central bore containing bearing and support means shown in FIG. 4, whereby a small shaft 8 is mounted so as to be freely rotatable within the bore in clamped member 9. The lower end of shaft 8 is preferably provided with a slight taper so that hollow sleeve 6 may be slid onto shaft 8 and held in place by friction. The bottom of sleeve 6 carries the lens blank which may be mounted thereon by any suitable means. The use of double faced adhesive tape having a central hole slightly smaller in diameter than the inside diameter of the sleeve 6 is particularly advantageous. While grinding the lens it is necessary to check the diopter value of the lens and this is easily done by slipping sleeve 6 off shaft 8 and checking the lens in a lensometer. Since the sleeve 6 is hollow, it is not necessary to remove the lens therefrom to check it and the problem of recentering the lens in the grinding apparatus is thereby eliminated. The entire spinner mechanism, which includes the cylindrical sleeve 6, the shaft 8 and the clamped member 9, can be raised, lowered and moved at any angle from the vertical and then accurately repositioned.

The apparatus described herein is extremely versatile in positioning the spinner assembly and contact lens blank in relation to the rotating bowl and chamois skin. In actual operation of the apparatus the free wheeling spinner is caused to rotate when the lens is pressed against the spinning chamois skin at an angle, thereby converting the single vision lens blank into a multifocal contact lens.

While this invention has been disclosed primarily with respect to contact lenses and their manufacture, it should be understood that it is not limited thereto but can be used to produce similar multifocal lenses for other uses such as in cameras, flashlights, searchlights or other applications in which a lens having a circumferential area of one diopter surrounding a central area having a lower diopter is suitable.

I claim:
1. A process for making a multifocal lens comprising the steps of:
    (a) binding a single vision lens blank on a free spinning assembly and positioning the assembly at a fixed angular attitude with respect to the vertical;
    (b) spinning a stretched flexible member which is supported at its periphery directly below and in contact with the lens blank;
    (c) coating the member with a grinding compound;
    (d) grinding the lens to within .25 diopter of the distance correction through contact with the coated spinning member;
    (e) changing the angle of the free spinning assembly to a vertical angle;
    (f) contacting the lens with the spinning coated member until the final .25 diopter are removed; and
    (g) removing the lens from the spinning assembly.

2. A process for producing a multifocal lens comprising the steps of:
    (a) stretching a flexible member and supporting it about its periphery;
    (b) coating the member with a grinding compound;
    (c) spinning the coated member;
    (d) mounting a lens blank on a free spinning assembly; and
    (e) contacting the mounted lens blank with the spinning coated member at an angular relationship therewith.

3. A process for producing a multifocal lens from a single vision lens comprising the steps of:
    (a) stretching a flexible member and supporting it about its periphery;
    (b) coating the member with a grinding compound;
    (c) mounting a single vision lens blank to a free spinning assembly and positioning the mounted lens blank above the coated member;
    (d) spinning the coated member; and
    (e) grinding the center portion of the mounted single vision lens blank to a distance correction diopter by contacting the center portion of the single vision lens blank with the spinning coated member.

4. A process for converting a single vision lens into a multifocal lens comprising the steps of:
    (a) selecting a single vision lens blank having a single diopter rating equivalent to a near correction diopter;
    (b) mounting the concave side of said single vision lens blank on a freely rotating assembly capable of assuming an angular relation with the vertical;
    (c) contacting the convex surface of the single vision lens blank in angular relation with a spinning stretched flexible member supported about its periphery and coated with a grinding compound; and
    (d) grinding the center portion of the lens blank to conform to the distance diopter correction prescription.

References Cited
UNITED STATES PATENTS

| | | | |
|---|---|---|---|
| 2,328,533 | 8/1943 | Walker | 51—284 X |
| 3,050,909 | 8/1962 | Rawstron | 51—284 X |
| 3,112,581 | 12/1963 | Hoffman | 51—284 X |
| 3,360,889 | 1/1968 | Borish | 51—284 |

LESTER M. SWINGLE, Primary Examiner